United States Patent
Poulos et al.

[11] Patent Number: 6,132,786
[45] Date of Patent: Oct. 17, 2000

[54] LONG-TERM MOLD INHIBITION IN INTERMEDIATE MOISTURE FOOD PRODUCTS STORED AT ROOM TEMPERATURE

[75] Inventors: Peter G. Poulos, Stamford, Conn.; Jill Critchley, Ridgewood; Robert E. Diaz, Jr., Ringwood, both of N.J.

[73] Assignee: Nabisco Technology Company, Wilmington, Del.

[21] Appl. No.: 09/270,714

[22] Filed: Mar. 17, 1999

[51] Int. Cl.$^7$ .......................... A21D 15/08; A21D 17/00; A23L 3/3472
[52] U.S. Cl. .......................... 426/326; 426/331; 426/335; 426/532; 426/549
[58] Field of Search .......................... 426/61, 326, 321, 426/331, 335, 532, 549, 574, 805

[56] References Cited

U.S. PATENT DOCUMENTS

| | | |
|---|---|---|
| 4,497,833 | 2/1985 | Anderson . |
| 5,096,718 | 3/1992 | Ayers et al. ................................ 426/9 |
| 5,219,603 | 6/1993 | Boudreaux et al. ..................... 426/326 |
| 5,260,061 | 11/1993 | Ayers et al. ............................. 424/115 |
| 5,635,484 | 6/1997 | Ayers et al. ............................. 514/18 |
| 5,639,659 | 6/1997 | Barefoot et al. ..................... 435/252.1 |
| 5,731,029 | 3/1998 | Karwowski et al. . |

FOREIGN PATENT DOCUMENTS

| | | |
|---|---|---|
| 7115950 | 10/1993 | Japan . |
| WO 98/16124 | 4/1998 | WIPO . |

OTHER PUBLICATIONS

DeMan, J.M., *Principles of Food Chemistry*, Van Nostrand Reinhold, New York, 1980, pp. 412–414.

Potter, N.N., *Food Science*, AVI Pub. Co., Westport, CT, 1986, pp. 160–161.

*Primary Examiner*—Keith D. Hendricks

[57] ABSTRACT

Food grade metabolites produced by Propionibacterium sp., alone or in combination with at least one adjunct organic acid preservative ingredient such as sorbic or benzoic acid or their food grade salts, inhibit mold and extend the shelf life of packaged food products such as baked goods having a water activity ($a_w$) of about 0.60 to about 0.80, on storage at room temperature for six months or more. Mold control is obtained in a variety of food products, including those particularly susceptible to mold such as moist fruit filled bar cookies, other intermediate moisture cookies, cakes having dollops of fruit-based filler, pet food snacks, and the like, while simultaneously providing superior organoleptic and sensory attributes in the products.

32 Claims, No Drawings

LONG-TERM MOLD INHIBITION IN INTERMEDIATE MOISTURE FOOD PRODUCTS STORED AT ROOM TEMPERATURE

TECHNICAL FIELD OF THE INVENTION

This invention relates to the preservation of packaged food products having intermediate water activity, particularly baked goods including those containing fruit such as filled fruit bars, to extend their shelf life when stored at room temperature for months.

Microorganisms in a healthy growing state may contain in excess of 80% water. They get this water from the environment in which they grow. In the case of microorganisms that cause food spoilage, this is the food product and its container, packaging and/or storage location. If water is removed from the food, water will correspondingly be removed from microorganism cells and multiplication will stop. Partial drying is less effective than total drying, though for some microorganisms partial drying as in concentration may be quite sufficent to arrest bacterial and yeast growth and multiplication, but not molds. Bacteria and yeasts generally require more moisture than molds, and so molds often will be found growing on semi-dry foods where bacteria and yeasts find conditions unfavorable. Examples are mold growing on stale bread and partially dried fruits.

Minimizing food spoilage due to the activities of bacteria, molds, and yeasts has concerned food purveyors for centuries. Slight differences in relative humidity within a room in which food is held, or within a food package, can greatly affect the rate at which microorganisms multiply. Since microorganisms can live in one part of a food that may differ in moisture and other physical and chemical conditions from the food just millimeters away, the microenvironment of the microorganisms must be considered in food preservation. Thus, it is common to refer to water conditions in terms of specific activity. The term "water activity" ($a_w$) is defined as the ratio of the partial pressure of a solution or other material to the vapor pressure of pure water at the same temperature, and is related to relative humidity (RH). Relative humidity refers to the atmosphere surrounding a solution or other material. Under equilibirium conditions, water activity equals RH/100. Moisture requirements of microorganisms really means water activity in their immediate environment, whether it be in solution, in a particle of food, or at a surface in contact with the atmosphere. At the usual temperatures permitting microbial growth, most bacteria require an $a_w$ in the range of 0.90 to 1.00. But some yeasts and molds grow, albeit typically slowly, at an $a_w$ as low as 0.61, and thus molds plague long term storage of intermediate moisture food products.

Food preservation against microbial spoilage is further complicated by the fact that microorganisms have different biochemical and nutritional needs, so that preservatives or treatment methods that inhibit one type often do not inhibit another. Among spoilage microorganisms, molds are among the most significant because they are so versatile in their nutritional, light, and temperature requirements for growth, and because their spores are so ubiquitous. Food products having intermediate to high $a_w$, particularly above 0.61, especially above 0.68, are more prone to mold development on storage than drier products, and the effect increases with the increasing moisture content of the product.

Adjustment and control of water activity to preserve semimoist and intermediate-moisture foods were used for a very long time before these effects were explained scientifically. Low to intermediate-moisture foods contain moderate levels of moisture, e.g., on the order of $a_w$ 0.20 to 0.60, which is less than is normally present in natural fruits, vegetables, or meats, but more than is left in conventionally dehydrated products. In addition, many intermediate-moisture foods contain sufficient dissolved solutes to decrease water activity below that required to support microbial growth. As a consequence, many intermediate-moisture foods do not require refrigeration to prevent microbial deterioration. Natural products such as honey; manufactured confectionery products high in sugar, plus jellies, jams, and fruit cakes; partially dried products including figs, dates, jerky, pepperoni, and the like can be stored at room temperature in rather simple packaging for extended periods. Refrigeration, pH manipulation, aseptic processing, oxygen exclusion, and use of chemical additives have all been employed to minimize microbial contamination and proliferation, especially by molds, in other food products, particularly those having a water activity of 0.60 and above.

BACKGROUND OF THE INVENTION

A number of chemical food preservatives have been employed against molds (as well as bacteria and yeasts) including sodium benzoate, often used in soft drinks and acidic foods; sodium and calcium propionates used in breads, cakes and cheeses; sorbic acid used in cheeses, moist dog foods, fruit juices, wines, and some baked products; and chlorine compounds used as a germicidal wash for fruits and vegetables (Potter, N. N., *Food Science*, 4th ed., AVI, CT, 1986, pp. 160 to 161 and DeMan, J. M., *Principles of Food Chemistry*, Van Nostrand Reinhold, N.Y., 1980, pp. 412–413; these book excerpts, and the others and patents cited hereafter, are expressly incorporated herein in their entireties by reference). Generically, "preservatives" also include fumigants such as ethylene oxide and ethyl formate used to control microorganisms on spices, nuts and dried fruits, and sulfur dioxide and sulfites used in wines (ibid.).

In 1985, Anderson disclosed the use of a Propionibacterium to ferment whey, thereby providing a composition containing propionic acid that exhibited mycostatic activity (U.S. Pat. No. 4,497,833). The patent suggested that the composition might be useful in bread and other bakery products (column 1, line 20). However, propionic acid has a distinct, unpleasant taste and stimulates a gag or vomiting reflex at concentrations lower than other similar organic acids such as acetic acid or citric acid.

Some years later, Boudreaux and Matrozza suggested using a propionate salt such as sodium or calcium propionate, or a propionate salt provided by fermenting *Propionibacterium shermanii* and then neutralizing the culture, to inhibit bacterial growth in raw or processed meat products (U.S. Pat. No. 5,219,603). A bacteriocidal composition combining a propionate with a bacteriocin produced by a Pediococcus species was also suggested to have efficacy for the same purpose.

More recently, Ayres, et al., at Oregon State University suggested that food might be preserved using metabolites of propionibacteria other than propionic acid (U.S. Pat. No. 5,096,718). Though the patent included yeasts, bacteria, and molds as target microorganisms (column 4, lines 41 to 44) and the examples illustrated mold inhibition in a yogurt substitute (Example 18), apple cider (Example 19), reconstituted orange juice (Example 20), and sour cream (Example 21), the claims were directed to gram-negative bacteria control. Additionally, with the exception of sour cream which was cultured for 46 days before mold appeared in a product containing propionibacterial metabolites, most of the reported studies involved product incubation for only a few days up to a week. Conditions for long-term storage at room temperature, and storage of products that are not typically refrigerated, were not disclosed.

Continuation-in-part application U.S. Pat. No. 5,260,061 to Ayers, et al., was directed to yeast control using propionibacterial metabolites, but mentioned mold control at column 1, line 25, column 2, lines 40 to 53, and column 3, line 17 to column 4, line 21. However, the text confused propionic acid/propionates with other metabolites, and the claims only covered protection against yeast spoilage. And, like the parent case, conditions for long-term storage at room temperature of products with low to moderate relative humidity were not mentioned. Instead, the examples illustrated yeast inhibition in yogurt, yogurt substitutes, sour cream, and fruit juices.

A third related application, U.S. Pat. No. 5,635,484 to Ayers, et al., described a peptide produced by propionibacteria, chemical synthesis, or cloned gene expression that was useful in preventing and treating gram-negative bacterial infections. Though of low molecular weight and therefore belonging to a subcategory, the peptide was nonetheless considered a bacteriocin (column 15, lines 37 to 39). Exactly two weeks later, U.S. Pat. No. 5,639,659 to Barefoot and Grinstead issued. It also disclosed a bacteriocin from a Propionibacterium for controlling certain lactic acid bacteria that spoiled dairy products such as yogurt and cottage cheese by over-acidification. Mold control was not addressed.

Japanese patent publication Kokai No. 7-115950 (application no. 5-289749) also disclosed use of propionibacterial bacteriocins, but in combination with a variety of compounds, including organic acids and their salts, essential oils and plant components for preserving foods (translation page 1, claim 1). More-over, the disclosure employed the bacteriocin activity against gram-positive and listeria bacteria (translation page 6, last line to page 7, line 2), not yeasts and molds, and the adjunct ingredients were described as primarily increasing bacterial cell membrane permeability (see, for example, translation page 8, paragraph 2, line 3 and paragraph 4, line 6 and page 9, 3 lines from page bottom). The specification was primarily directed to meat and fish product storage (translation page 10, paragraphs 3 and 4), and the examples illustrated hamburger, a Japanese radish product, and pollock.

More recently, WO 98/16124 to King, et al., disclosed the inhibition of yeast and molds in food products other than hamburger having a pH of greater than 5.5, more preferably greater than 5.8, and most preferably greater than 6.0, using propionibacterial metabolites and a potentiator such as chelators, essential oils, or organic acids (page 3, lines 21 to 27, and page 8, lines 7 to 12). The longest reported mold inhibition in a food product after storage at room temperature was after 28 days in coffee cakes (Example 1). The only other food product illustrated was a cheesecake stored refrigerated for six weeks (Example 2). The other examples reported data about mold and yeast growth in an in vitro incubation of potato dextrose broths for 48 hours (Example 3), 5 days (Example 4), and 7 days (Example 5).

It would be desirable to have improved compositions for the long-term preservation of food products stored at room temperature, especially packaged bakery products that have a tendency to develop mold growth. This is a particular problem with moist baked goods, especially those containing fruit such as figs, which are often contaminated with "smut", typically caused by spores of *Aspergillus niger* that are often difficult to detect on the fruit or in fruit ingredients such as pastes used in the manufacture of baked goods. In addition, some stored fruit-containing bakery products, especially those containing sugar in a fruit phase, if subjected in transit or storage to heat, tend to leak syrup that can exacerbate mold growth.

SUMMARY OF THE INVENTION

It is an objective of the invention to extend the shelf life of packaged intermediate moisture food products stored at room temperature for extended periods.

It is a further objective of the invention to inhibit mold growth in moist, organoleptically pleasing and flavorful fruit-containing bakery products that are particularly susceptible to mold formation when stored.

It is an additional objective of the invention to provide fruit bars and other intermediate baked products exhibiting superior quality and consumer acceptance.

These and other objectives of the invention are accomplished by the present invention, which provides food products containing food grade metabolites produced by a culture of Propionibacterium, alone or in combination with adjunct ingredients, in an amount sufficient to inhibit mold growth when the product is stored at room temperature for at least about three months, preferably at least about six months, and the product has a water activity of about 0.60 to about 0.80. Methods of preserving food products with the metabolites and providing superior foods are also provided. Typical propionibacterial metabolites are prepared by culturing *Propionibacterium shemanii*, *Propionibacterium freudenreichii*, *Propionibacterium pentosaceum*, *Propionibacterium thoenii*, *Propionibacterium arabinosum*, *Propionibacterium rubrum*, *Propionibacterium jensenii*, or *Propionibacterium peterssoni* species. In one embodiment, *Propionibacterium shermanii* is grown in a culture containing milk, whey, lactic acid, maltodextrin, and/or lactic acid, and then pasteurized.

Preferred embodiments further contain an adjunct preservative ingredient in addition to the propionibacterial metabolites, to provide an effective, economical dual preservative system. Typical adjunct ingredients include an organic acid such as acetic, propionic, lactic, sorbic or benzoic acid and/or their food grade salts.

The invention is particularly efficacious for the long-term preservation of moist bakery products containing a fruit phase and a casing phase such as fig, strawberry, apple, cherry, tropical fruit, strawberry, raspberry, peach, apricot, or cranberry bars, cake products containing dollops of the same types of fruit-based fillers, other intermediate moisture baked goods such as brownies, toaster pastry like products, and moist pet snacks. In many embodiments, use of propionibacterial metabolites according to the invention provides moister products that exhibit superior quality and texture when compared to analogous products made with conventional recipes. Thus, use of propionibacterial metabolites enhances the organoleptic and sensory attributes of intermediate moisture products.

DETAILED DESCRIPTION OF THE INVENTION

This invention is based upon the finding that food grade propionibacterial metabolites, alone or in combination with adjunct ingredients such food grade organic acid preservatives or their salts, are useful for inhibiting and preserving against mold growth in intermediate moisture food products packaged to prevent moisture exchange and stored for months at room temperature.

In the practice of the invention, the metabolites are added to food products in amounts effective to inhibit visually observable mold growth for at least about three months, preferably at least about four to six months, and in many cases even longer, at room temperature, i.e., from about 20° to about 25° or 28° C., where the products have a water activity ($a_w$) of from about 0.60 to about 0.80. The invention is especially efficacious in the preservation of filled fruit bars, cake products containing dollops of fruit, and other moist baked food products which exhibit an $a_w$ of between about 0.65 to about 0.78. In many embodiments, products exhibiting an extended shelf life have a pH of from about 3.5 to about 6.5, more narrowly from about 4.0 to 5.7, and even more narrowly from about 4.4 to about 5.5. As illustrated below, both natural and and a variety of xerophilic and non-xerophilic molds do not appear on products made according to the invention when packaged in protective wrappers that prevent moisture loss and stored over half a year at room temperature, under conditions wherein other preservatives such as benzoate or sorbate alone do not prevent mold growth.

Food grade propionibacterial metabolites useful in the practice of the invention are obtained by growing a Propionibacterium such as *Propionibacterium shermanii, Propionibacterium freudenreichii, Propionibacterium pentosaceum, Propionibacterium thoenii, Propionibacterium arabinosum, Propionibacterium rubrum, Propionibacterium jensenii*, and/or *Propionibacterium peterssoni* in a culture medium. Though cultures on a solid support may be employed, cultures are more commonly liquids formulated with milk or whey and/or containing yeast extracts or fruit juices or any other broth containing appropriate growth nutrients. After development of propionibacteria, typically up to about $10^6$ to $10^{10}$ cells per ml, the growth liquid may be heated (pasteurized) to kill any inoculated and/or adventitious bacteria.

To facilitate storage and shipment, the culture media may be dried to form a powder, or frozen before use as mold inhibitor or self life extender. The metabolites may be separated or purified from the media, or employed as a mixture. Metabolites useful in the practice of the invention include all mycostatic compounds produced by the cultures, including propionic acid, provided that at least one other metabolite that is more inhibitory to mold than is due to the propionic acid alone, and/or salts of the acid, is included in the preservative composition. Generally inhibition of mold growth is obtained when the final propionic acid concentration in the product is considerably less than 0.2% by weight, which is reported to be the minimum amount of propionic acid for an observable antimicrobial effect in many types of food products. Food products containing less than 0.1% propionic acid, and in many cases less than 0.02% by weight propionic acid, are especially preferred in some embodiments.

The liquid, condensed, dried, or frozen metabolites are then added to food product recipes at any stage of preparation in amounts effective to inhibit molds. In the case of filled fruit bar cookies and cakes containing dollops of fruit-based filler, preservatives according to the invention may be added to the fruit/jam portion or to the casing/cake portion or both. In preferred embodiments, metabolites, alone or in combination with adjunct preservatives discussed more fully below, are added to the fruit or both portions, preferably both. Effective amounts vary with the pH and $a_w$ of the product, the nature of the solutes in the formulation, packaging atmosphere, integrity and composition, as well as storage temperature. In many embodiments such as filled fruit bars, metabolites comprise from about 0.01% to about 10%, preferably from about 0.5% to about 5.0%, by weight of the finished product weight. (As used herein, the term "by weight" refers to finished product weight unless otherwise indicated.) Some embodiments contain from about 0.3% to about 1.5%, more narrowly from about 0.5% to about 1%, by weight of the product. Examples are given hereafter.

It is an advantage of the invention that numerous cultures producing useful edible metabolites are readily available. Many can be obtained, for example, from the American Type Culture Collection (ATCC) in Rockville, Md., and from the Iowa State University (ISU), Department of Food Technology Propionibacterial Culture Collection in Ames, Iowa. These have been characterized for their effectiveness in inhibiting food spoilage and food spoilage microorganisms, and include, but are not limited to, *P. jensenii* cultures denoted ISU $P_{25}$, ATCC #4869, and ATCC #4872; *P. shermanii* ATCC cultures denoted $P_{31c}$, #8262, #9615, #9616, #9617, and #13673; *P. thoenii* cultures denoted ISU $P_{15}$ and ATCC #4874; *P. freudenreichii* subspecies shermanii cultures denoted ISU $P_1$, $P_7$ and $P_{12}$; and *P. freudenreichii* culture denoted ATCC #6207.

Several commercial products containing food grade propionibacterial products are also available. These include Microgard® products available from Rhodia, Inc., which typically comprise propionibacterial metabolites prepared by growing *Propionibacterium shermanii* in a culture medium containing milk, whey, lactic acid, maltodextrin, and/or lactic acid, and then pasturizing (U.S. Pat. No. 5,639,659 at column 2, lines 39 to 46). Most Microgard® products are primarily bacteriostatic rather than antifungal, and thus have been employed to inhibit spoilage in refrigerated salad dressings, salads, soups, cottage cheese, ricotta cheese, soups, fruit juices, dessert cups, confections, fresh salsas and other prepared sauces including pizza sauces, and the like. The family of products include MG100, Dry Dairy Microgard™ (Grade A), a pasteurized lactic acid culture that is dried and standardized with Grade A nonfat milk solids; MG200, Dry Nondairy Microgard™ (Red Label) consisting of a pasteurized dairy culture grown on dextrose that has been standardized with maltodextrin; MG250, Condensed Nondairy Microgard™ (Red Label) consisting of a pasteurized dairy culture grown on dextrose marketed as a frozen slurry; and MG400, Dry Dairy Microgard™ Blend, a 50:50 blend of MG100 and MG300. Also available is MG300, Dry Dairy Microgard™ Gram Plus, a pasteurized lactic acid culture that has been dried and standardized with Grade A skim milk solids containing bacteriocidal peptides. However, it is not effective against mold, and so it is not preferred in the practice of this invention. MG200 is employed in some examples that follow.

Preferred embodiments comprise an adjunct preservative ingredient in addition to the propionibacterial metabolites to broaden the spectrum of microbial preservation and decrease the cost of the system. Any food grade preservative may be employed as an adjunct ingredient. Typical adjunct ingredients are organic acids such as acetic acid, propionic acid, lactic acid, sorbic acid, fumaric acid, ascorbic acid, citric acid, adipic acid, caprylic acid, malic acid, succinic acid, tartaric acid, benzoic acid, and/or their food grade salts such as sodium, potassium, and calcium salts, including, but not limited to sodium sorbate, potassium sorbate, calcium sorbate, sodium benzoate, potassium benzoate, calcium benzoate, and mixtures of any of these, and the like. Potassium sorbate and sodium benzoate are illustrated hereafter. As with the primary metabolite ingredient, the adjunct preservative ingredients are added to product recipes at any stage of product preparation in amounts effective to enhance the efficacy of mold inhibition of the propionibacterial metabolites and/or decrease amounts of metabolites necessary to inhibit mold on long-term storage. In typical embodiments, food grade organic acids and/or their salts are used at levels ranging from about 0.01% to about 0.3%, more narrowly from about 0.03% to 0.1% by weight of the finished product. As mentioned above, in bakery products having a fruit phase and a pastry phase, the combined preservative may be added to either phase, preferably the fruit, more preferably, both.

In preferred embodiments, observable mold, i.e., mold visible to the naked eye on inspection of the package, is inhibited for at least about six months or longer in intermediate-moisture packaged and stored food products. These products typically exhibit a water activity of from about 0.60 to about 0.80, more narrowly from about 0.60 to about 0.75 or 0.78. As discussed above, by "water activity" ($a_w$) is meant the measure of the free moisture in a food, and is the quotient of the water vapor pressure of a substance divided by the vapor pressure of pure water at the same temperature (21 C.F.R. § 110.3(r)). The $a_w$ of a food is a measure of the free water in a system available to support biological and chemical reactions that can lead to microbial deterioration. Water activity is generally determined instrumentally by placing the food formulation in a vessel of limited headspace at a chosen temperature. The vessel is provided with a sensitive hygrometer sensor not in contact with the food but connected to a potentiometric recorder. As the food exchanges moisture with the headspace, a curve of relative humidity is traced. In the Examples that follow, an instrument using a chilled mirror is employed. The $a_w$ corresponds to the relative humidity divided by 100 at equilibrium, which can be measured with highly sensitive wet bulb and dry bulb temperature probes. Thus, as used herein, the terms "relative humidity" and "water activity" are employed to describe the same parameters reported on scales differing by a multiple of 100.

Propionibacterial metabolite preservatives of the invention are useful for a variety of bakery products, including cookies, crackers, biscuits, cakes, pastries snacks, and the like, which ordinarily contain a flour and/or another starch component, or ground nuts or nut meals. Bakery products include leavened, both yeast raised and chemically leavened, and unleavened baked products. The invention is especially adapted for preserving moist packaged cookies, including those containing fruit. Fruit-containing bakery products include those having fruit dispersed in the pastry or starch component, and those having a fruit phase and a pastry phase such as filled fruit bars. Bar cookies include, but are not limited to, fig, apple, cherry, strawberry, raspberry, tropical fruit, peach, apricot, peach/apricot and cranberry bars, and the like. Some are illustrated in the Examples that follow. Cake products containing dollops of the same types of fruit-based filler can also be preserved using methods and compositions of the invention. Products prepared with the preservative system of the invention can be packaged conventionally in plastic, multilaminate metalized polypropylene, and the like, which prevent moisture loss.

It is a further advantage of the invention that not only are the shelf lives of fruit-containing bakery and other intermediate moisture products extended, but use of the preservation system improves overall product quality and consumer acceptance. Conventional shelf-stable fruit-filled bar cookies, for example, are perceived by some consumers as too dry. Corresponding fruit bars of the invention, on the other hand, are significantly softer and moister, exhibiting superior texture and overall quality. As illustrated in Examples 3 to 5 below, an $a_w$ increase of about 5 to 10% in fruit bar recipes enhances flavor and texture, improving the sensory attributes of the products. Thus the invention provides not only longer-lived products and products, but also superior products and methods for making them. Propionibacterial metabolites, alone or with an adjunct preservative, protect higher moisture products from spoilage so that products made according to the invention are not only mold-free, but are also organoleptically pleasing and full-flavored, even after relatively long-term storage. Filled fruit bars, for example, are moist and palatable when made according to the invention.

Propionibacterial metabolites, alone or in combination with an adjunct preservative ingredient, can also be used to inhibit mold growth in other moist food products, including other intermediate baked products such as brownies and other bar cookies, granola and other cereal bars, toastettes, and the like. In addition, shelf-stable pet food products containing meat and, typically, a binding agent, as well as moist pet food products such as the meat-based jerky products described by Karwowski, et al., in U.S. Pat. No. 5,731,029. As used herein, the term "meat" includes meat, fish, meat substitutes and meals used in pet foods, and mixtures thereof, such as thosed disclosed by Karwowski, et al. Most intermediate moisture products prepared according to the invention exhibit a higher moisture content than those prepared using conventional recipes and provide a more organoleptically pleasing and flavorful baked goods than those that are drier.

In summary, bakery and other products prepared according to the invention exhibit a number of desirable characteristics. Food products having a final water activity value, including baked goods having a fruit filling, that typically mold after short-term storage at room temperature are preserved for much longer periods without loss of product quality. Preservatives employed according to the invention are neutral in taste and do not change the flavor of the product. On the contrary, as mentioned above, flavor and palability are often enhanced because higher moisture contents are possible. The preservative system of the invention does not alter dough or jam consistency; doughs and other components of food products containing the preservatives can be processed with conventional machinery. Moreover, there are no deleterious changes in the consistency or structural integrity of the finished or stored baked goods or other food products observed when the preservation system of the invention is employed. Many products made according to the invention, including pet food snacks, exhibit desirable sensory attributes and flavor because of their higher moisture content.

EXAMPLES

The following examples are presented to further illustrate and explain the present invention and should not be taken as limiting in any regard. Unless otherwise indicated, all percentages given are by weight, and refer to weight percentage at the particular processing step described. The examples provide illustrative recipes for fig bars, but it is to be understood that the invention has wide applicability in other embodiments, not only for the shelf life extension of other fruit bars such as cranberry, strawberry, and apple bars, but also in other recipes for bakery products for mold inhibition.

For measurements of water activity, a Decagon model CX-2 water activity meter (Decagon Devices, Inc., Pullman, Wash.), was employed. The instrument measures water activity by use of a chilled mirror sensor that determines the dew point of the atmosphere over a sample. Samples are ground in a small blender to a uniform consistency prior to loading directly into the cup of the Decagon instrument to minimize moisture loss. Upon closure of the chamber, the instrument starts automatically.

Examples 1 and 2 compare and contrast mold growth over time on fruit bar cookies challenged with a variety of molds. Control cookies contained no preservatives; test cookies contained the various preservatives denoted hereafter, either in the filling or the casing, or both. Typical fruit filled bars comprise a pastry casing surrounding a fruit jam filling (see, for example, Ellis, P. E., ed., *Cookie & Cracker Manufacturing*, vol. II, Biscuit and Cracker Manufacturers' Assoc., Washington, D.C., 1991, p. 437 and Matz, S. A., and Matz, T. D., *Cookie and Cracker Technology*, 2nd ed., Avi Pub. Co., Westport, Conn., 1978, pp. 191–192). A typical two-component product consists of about 60% fig, apple, cherry, or other jam or jam mixtures as the filling and about 40% dough in the jacket. The jacket dough is composed of much the same ingredients as a wire-cut cookie.

A fruit bar jacket dough can be prepared using the following ingredients:

| ingredients | amounts |
| --- | --- |
| flour | 100 lbs |
| sugar | 40 lbs |
| invert syrup | 5 lbs |
| shortening | 20 lbs |
| eggs | 8 lbs |
| dry skim milk | 3 lbs |
| baking soda | 0.50 lb |
| cream of tartar | 0.50 lb |
| ammonia | 0.50 lb |
| salt | 1 lb |
| water | 20 lbs |

Shortening, salt, and sugar are creamed together with the dry skim milk and eggs. When a thoroughly homogeneous mixture has been obtained, ammonia and invert syrup are added, and creaming is continued for a few minutes. Water is added, and the flour is mixed in with the other ingredients. The final mixing phase usually takes about 13 minutes at 20 rpm in a horizontal mixer. In many cases, this multistage process may be abbreviated.

Other jacket doughs are prepared using the same procedure. Four recipes contain ingredients as follows:

| ingredients | amounts (in lbs) | | | |
| --- | --- | --- | --- | --- |
| | recipe 1 | recipe 2 | recipe 3 | recipe 4 |
| flour | 100 | 100 | 100 | 100 |
| sugar | 40 | 38 | 40 | 35 |
| invert syrup | 10 | 12 | 5 | 15 |
| corn syrup | — | 12 | 5 | — |
| shortening | 25 | 22 | 20 | 20 |
| eggs (frozen whole) | — | — | 8 | 5 |
| dried yolks | — | 1.5 | — | — |
| nonfat dry milk | — | 1.5 | 3 | 1.5 |
| sodium bicarbonate | 0.5 | 0.62 | 0.5 | 0.62 |
| ammonium bicarbonate | — | 0.25 | 0.5 | 0.38 |
| salt | 1.5 | — | 1 | 1.5 |
| nondiastatic malt | 2 | — | — | — |
| defatted cooked cottonseed meal | 0.75 | — | — | — |
| water (variable) | 24 | 16 | 20 | 22.5 |

The selection and amounts of a shortening component (where employed), cracker meal use, and water are adjusted to control the consistency of the dough and its response to baking. For fat-free filled fruit bars, the shortening component is omitted; in these cases, softening agents may be added to achieve proper dough rheology. Some low calorie embodiments employ a low calorie fat in full or partial replacement of the shortening component. Many doughs are not flavored, but small amounts of flavoring may be used as desired. Some formulae include some eggs to keep the casings soft and tender. Flour is typically selected to be of moderate strength so that the structure of the casing around the jam center is maintained, and to give expansion properties to the bottom layer on baking.

Fruit filler is prepared by combining

| ingredients | amounts |
| --- | --- |
| fruit jam | 100 lbs |
| sugar | 50 lbs |
| glucose | 30 lbs |
| invert syrup | 20 lbs |
| salt | 0.75 lb |
| tartaric acid | 0.25 lb |
| fruit jam | 100 lbs |
| granulated sugar | 50 lbs |
| dextrose | 10 lbs |
| invert syrup | 10 lbs |
| salt | 0.2 lb |
| and citric acid | 0.1 lb. |

The filler is processed conventionally, while the ingredients varied somewhat depending upon the characteristics of the fruit used and the texture and flavor expected in the finished product. The final pH of the filler typically ranges from 3.5 to 5.5. Typically, the jacket dough and fruit filler are mixed in separate mixers, finished into hoppers, and pumped into a coextruder, which deposits the unbaked cookies onto a baking surface. For the commonest bar size, a baking time of about 7 to 8 minutes at an average temperature of about 450 to 475° F. is adequate.

Examples 3 to 5 report consumer taste tests that compare the flavor, texture, moistness, and related sensory attributes of fruit bar cookies prepa red according to the invention containing food gade propionibacterial metabolites with control (commercially available) fruit bars containing no metabolites. As summarized in the examples, the methodology employ ed was a mall-intercept central location test, using sequential monadic sampling and reporting; results were statistically evaluated using a complete block design. Consumers sampled different cookies and then reported their impressions of overall, flavor, and texture acceptibility, appearance, color, aftertaste, and and the like, in questionnaires that allowed the evaluation of various parameters on scales representing perception extremes. The results are reported on a scale of 1 to 9, with 1 corresponding to dislike extremely and 9, to like extremely.

Example 1

Mold growth over time was assessed after challenge with various mold spores on apple and cranberry bar cookie products prepared with or without preservatives in the jam and/or casing portions using conventional recipes as set out above. Where a dual preservative system is employed, these may be preblended and then added to other ingredients of the casing or jam pnor to baking, although this is not required. Bars containing preservatives in both the jam and casing portions of the cookies are compared with corresponding control bars containing no preservatives or potassium sorbate (denoted KS in this and and in subsequent examples) or sodium benzoate (denoted NB) only as a preservative. Microgard® 200 (denoted MG in this and subsequent examples) was employed to supply propionibacterial metabolites alone, or in combination with sodium benzoate.

Spores containing xerophilic two strains of Eurotium repens (exhibiting an optimal growth temperature of about 25° to 27° C.) and one of Wallenia sebi (exhibiting an optimal growth temperature of about 20° to 30° C.), often found in bakery environments, were employed in the mold challenge tests reported in this example. For mold spore preparation in this example and the next, sporulation plates were inoculated with pure mold cultures using MY50G agar (Pitt, J. I., and Hocking, A. D., *Fungi and Food Spoilage*, Academic Press, Sydney, Australia, 1997), and incubated at 25° C. for a minimum of 4 weeks to obtain mature spores. Typical inocula were about 300 spores per sample.

In a typical mold challenge test, 9 or 10 of the same type of filled cookie samples were placed cut side up in a lightweight plastic tray. Folded index card or other spacers were inserted between groups of three or four samples to segregate different cultures within the same tray, divide the tray into three regions, and prevent the samples from contacting packaging film. Three replicate sets of different challenge mold spores were inoculated across the jam and casing portions in each region, by making three streaks of each of mold species from the same culture in each region using the blunt end of a sterile, wooden swab. Controls were uninoculated. Each inoculated tray was inserted into a high moisture barrier clear film pouch (such as a 4.5 mil Scotch pack pouch #506), and heat sealed to prevent moisture loss. The sealed pouches were incubated at 83° F. and 60% RH. Samples were examined for mold growth after two weeks, and then at one month intervals for six months or longer. Water activity was measured at the end of the mold-free shelf life of each product. Using this procedure, the following results were obtained:

APPLE-FILLED COOKIES

|  | test 1 | test 2 | test 3 | test 4 | test 5 | test 6 |
|---|---|---|---|---|---|---|
| preservative | none | 0.1% KS | 0.05% KS +0.25% MG | 0.05% KS +0.5% MG | 0.1% KS +1.0% MG | 1.0% MG |
| water activity | 0.75 | 0.75 | 0.75 | 0.75 | 0.75 | 0.75 |
| mold-free shelf life | 2 wks. | 2 mos. | 3 mos. | >6 mos. | >6 mos. | >6 mos. |

CRANBERRY-FILLED COOKIES

|  | test 7 | test 8 |
|---|---|---|
| preservative | 0.1% NB | 0.1% NB + 1.0% MG |
| water activity | 0.75 | 0.74 |
| mold-free shelf life | 2 wks. | >6 mos. |

The results were the same for all three molds tested.

Example 2

This example reports further studies of mold appearance on packaged fig bars like those set out in Example 2 above, carried out using the same procedure, except that some additional molds were employed in the challenges, and 27 replications per challenge were tested. About three hundred spores were typically inoculated per sample. In addition to the *W. sebi* and two strains of *Eurotium repens* described above, *Eurotium rubrum* (exhibiting an optimal growth temperature of about 25° to 27° C.), *Eurotium herbariorum* (exhibiting an optimal growth temperature of about 25° to 27° C.), and Chrysoporium species were also used in challenge experiments. Using the six challenge molds, the following results were obtained:

|  | test A | test B | test C |
|---|---|---|---|
| preservative | 0.05% KS | 0.1% KS | 0.05% KS + 0.5% MG |
| water activity | 0.70 | 0.70 | 0.70 |
| mold-free shelf life | 2 mos. | 5 mos. | >8 mos. |

It can be seen from the data in Examples 1 and 2 that the Microgard® and Microgard®+sorbate or benzoate combination is more effective than either sorbate or benzoate alone in preventing mold growth after long term storage.

Example 3

Consumer perception and sensory impressions of a fat-free filled apple bar cookie prepared as described above, and the same product prepared containing food grade propionibacterial metabolites according to the invention were evaluated in taste tests conducted in Boston Mass., Nashville Tenn., Springfield Va., Tulsa Okla., and Pheonix Ariz. Two hundred consumers (100 females and 100 males) participated in the studies; 20% were aged 18 to 34, 40%, aged 35 to 54, and 40% aged 55 to 70. All either had purchased fat-free fruit bars in the past three months, consumed fat-free fruit bars at least twice a month, ate fat-free fruit bars within the past week, and/or had no objection to apple fruit bars. Participants responded to questionnaires about overall acceptability, apperance, overall flavor, flavor intensity, texture (including first bite texture, after eating texture, overall texture), color, sweetness level, moisture, and aftertaste.

Each participant sampled three products: a control fruit bar containing no MG or other propionibacterial metabolite and exhibiting an RH of 0.639, and two fruit bars prepared according to the invention, both containing 0.5% MG+0.05% KS; one sample bar exhibited an RH of 0.694 and the other, 0.715. On a scale of 1 to 9 (with 1 corresponding to dislike extremely and 9, to like extremely), the overall average acceptability of the control bar was 6.6, whereas the sample bars were 7.0 and 7.1 respectively. The sample bar values did not differ significantly at p>0.05, but there was a significant difference between sample bars and the control.

The findings illustrate that both products prepared in accordance with the invention had significantly higher overall acceptability ratings than the control. Overall flavor ratings were also higher for products of the invention than the control, as was flavor acceptance. Texture was not rated as superior to the control, however; while not wishing to be bound to any theory, it is hypothesized that the softer and moister texture of products made according to the invention may be perceived more than a flavor impact than texture, i.e., the softer and moisture texture results in a better eating experience (taste/flavor).

Example 4

Consumer testing like that described in Example 3 was repeated with fig bars. Consumer perception and sensory impressions of fig bars and the same product prepared containing food grade propionibacterial metabolites according to the invention were evaluated in taste tests conducted in Boston Mass., Rochester N.Y., Tulsa Okla., Jacksonville Fla., and Seattle Wash. One hundred-eighty consumers (90 males and 90 females) participated in the studies; 20% were aged 18 to 34, 40%, aged 35 to 54, and 40% aged 55 to 70. Half of the participants had purchased and eaten prepackaged fig bars in the past three years, and though they had not purchased them in the past year, expressed a willingness to do so again; half of the respondents had purchased and consumed fig bars in the previous three months, ate fig bars at least twice a month, and/or had consumed them in the past week. As in Example 3, participants responded to questionnaires about overall acceptability, apperance, overall flavor, flavor intensity, texture (including first bite texture, after eating texture, overall texture), color, sweetness level, moisture, and aftertaste.

Each participant sampled two products, a control fruit bar (denoted C below) containing no MG or other propionibacterial metabolite and exhibiting an RH of 0.669, and a sample bar prepared according to the invention (denoted S) containing 0.55% MG+0.05% KS and exhibiting an RH of 0.707.

The following table summarizes mean scores:

| category summary | C | S |
| --- | --- | --- |
| Overall Acceptability | 5.5[b] | 7.1[a] |
| Flavor Acceptability | 5.3[b] | 6.8[a] |
| Texture Acceptability | 5.2[b] | 6.7[a] |

[a,b](Values sharing a common letter do not differ significantly at $p < .05$.)

It can be seen from the data that, compared to the control, the filled bar prepared according to the invention was assessed as being superior to the control in all aspects of the study: overall acceptability, overall flavor, and overall texture.

Example 5

Consumer taste tests were conducted comparing control fat-free strawberry bars, fat-free apple bars, fig bars, and fat-free fig bars with corresponding sample bars containing 0.5% MG+0.05% KS. The sensory findings related to evaluations of these filled bars were then compared with the results obtained with fat-free apple bars evaluated in Example 3 and the fig bars of Example 4 as follows:

| Parameter | Control | Sample |
| --- | --- | --- |
| Fig Bars | | |
| Water Activity ($a_w$) | 0.67 | 0.71 |
| Overall Acceptability | 5.5[b] | 7.1[a] |
| Overall Flavor Acceptability | 4.0[b] | 6.8[a] |
| Fat-Free Fig Bars | | |
| Water Activity ($a_w$) | 0.64 | 0.69 |
| Overall Acceptability | 6.1[b] | 6.7[a] |
| Overall Flavor Acceptability | 6.0[b] | 6.7[a] |
| Fat-Free Apple Bars | | |
| Water Activity ($a_w$) | 0.64 | 0.69 |
| Overall Acceptability | 6.6[b] | 7.0[a] |
| Overall Flavor Acceptability | 6.5[b] | 7.0[a] |
| Fat-Free Strawberry Bars | | |
| Water Activity ($a_w$) | 0.66 | 0.71 |
| Overall Acceptability | 7.0 | 7.0 |
| Overall Flavor Acceptability | 6.9[b] | 7.1[a] |

[a,b](Values with a different letter reflect mean scores that are significantly different at a 95% confidence level.)

Texture/moisture appropriateness was also evaluated, and consumers rated fruit bars prepared according to the invention more appropriately moist, at a highly statistically significant p-value of 0.0001, than control bars for all four varieties. The data show that products made according to the invention are superior in quality, and are more acceptable to consumers than control bars.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

What is claimed is:

1. A food product comprising food grade metabolites produced by a culture of Propionibacterium in an amount sufficient to inhibit mold growth when the product is packaged to prevent moisture loss and stored at room temperature for at least about three months, and the product has a water activity of about 0.60 to about 0.80.

2. A product according to claim 1 which has a water activity of about 0.65 to about 0.78.

3. A product according to claim 1 which further comprises an adjunct preservative ingredient that is an organic acid or acid salt selected from the group consisting of lactic acid, acetic acid, propionic acid, sorbic acid, fumaric acid, ascorbic acid, citric acid, adipic acid, caprylic acid, malic acid, succinic acid, tartaric acid, benzoic acid, food grade salts of any of these, and mixtures thereof.

4. A product according to claim 3 comprising from about 0.5% to 5.0% by weight of the metabolites and from about 0.01% to about 0.3% by weight of the adjunct ingredient.

5. A product according to claim 3 comprising from about 0.03% to about 0.1% by weight benzoic acid, the sodium or potassium salt of benzoic acid, or mixtures thereof.

6. A product according to claim 3 comprising from about 0.03% to about 0.1% by weight sorbic acid, the sodium or potassium salt of sorbic acid, or mixtures thereof.

7. A product according to claim 1 wherein the food trade metabolites are produced by a Propionibacterium culture selected from the group consisting of *Propionibacterium shermanii, Propionibacterium freudenreichii, Propionibac-*

*terium pentosaceum, Propionibacterium thoenii, Propionibacterium arabinosum, Propionibacterium rubrum, Propionibacterium jensenii*, and *Propionibacterium peterssoni*.

8. A product according to claim 7 wherein the propionibacterial metabolites are produced by a *Propionibacterium shermanii* culture.

9. A food product according to claim 1, which is a bakery product having a casing phase and a fruit filler phase.

10. A product according to claim 9 which is a cookie comprising a fruit filling surrounded by a pastry casing.

11. A product according to claim 9 wherein the fruit filler phase comprises fruit selected from the group consisting of figs, cranberries, apples, cherries, raspberries strawberries, peaches, apricot, and mixtures thereof.

12. A food product according to claim 1, which is a pet food product containing meat.

13. A baked food product comprising an anti-mycotic combination of:
 (a) food grade propionibacterial metabolites produced by a Propionibacterium culture selected from the group consisting of *Propionibacterium shermanii, Propionibacterium freudenreichii, Propionibacterium pentosaceum, Propionibacterium thoenii, Propionibacterium arabinosum, Propionibacterium rubrum, Propionibacterium jensenii*, and *Propionibacterium peterssoni*, and
 (b) an adjunct organic acid preservative ingredient selected from the group consisting of lactic acid, acetic acid, propionic acid, sorbic acid, fumaric acid, ascorbic acid, citric acid, adipic acid, caprylic acid, malic acid, succinic acid, tartaric acid, benzoic acid, food grade salts of any of these, and mixtures thereof, in amounts sufficient to inhibit mold growth when the product is packaged to prevent moisture loss and stored at room temperature for at least about three months, and the product has a water activity of about 0.60 to about 0.80.

14. A product according to claim 13 which comprises from about 0.5% to about 5.0% by weight of the metabolites and from about 0.01% to about 0.3% by weight of the adjunct preservative ingredient.

15. A product according to claim 13 which has a water activity of from about 0.65 to about 0.78.

16. A product according to claim 13 which comprises, as the adjunct ingredient, from about 0.03% to about 0.1% by weight benzoic acid, the sodium or potassium salt of benzoic acid, or mixtures thereof.

17. A product according to claim 13 which comprises, as the adjunct ingredient, from about 0.03% to about 0.1% sorbic acid, the sodium or potassium salt of sorbic acid, or mixtures thereof.

18. A product according to claim 13 wherein the propionibacterial metabolites are produced from a *Propionibacterium shermanii* culture.

19. A product according to claim 13 wherein mold growth is inhibited for at least about six months.

20. A food product according to claim 13, which is a bakery product having a casing phase and a fruit filler phase.

21. A product according to claim 20 which is a cookie comprising a fruit filling surrounded by a pastry casing.

22. A product according to claim 21 wherein the fruit filling comprises fruit selected from the group consisting of figs, cranberries, apples, cherries, raspberries strawberries, peaches, apricot, and mixtures thereof.

23. A product according to claim 22 which comprises from about 0.03% to about 0.1% by weight adjunct ingredient selected from the group consisting of benzoic acid, the sodium or potassium salt of benzoic acid, sorbic acid, the sodium or potassium salt of sorbic acid, and mixtures thereof.

24. A product according to claim 22 which is a fig bar.

25. A product according to claim 24 which comprises from about 0.03% to about 0.1% by weight adjunct ingredient selected from the group consisting of benzoic acid, the sodium salt of benzoic acid, sorbic acid, the sodium or potassium salt of sorbic acid, and mixtures thereof.

26. A product according to claim 24 which exhibits a water activity of about 0.65 to about 0.78.

27. A product according to claim 13, which is a pet food product containing meat.

28. A method for preserving a baked product exhibiting a water activity of from about 0.60 to about 0.80, from observable mold growth when the product is stored at room temperature for about six months, by adding to the product from about 0.5% to about 5.0% by weight food grade metabolites produced by a culture of Propionibacterium selected from the group consisting of *Propionibacterium shermanii, Propionibacterium freudenreichii, Propionibacterium pentosaceum, Propionibacterium thoenii, Propionibacterium arabinosum, Propionibacterium rubrum, Propionibacterium jensenii*, and *Propionibacterium peterssoni*.

29. A method according to claim 28 wherein the propionibacterial metabolites are produced by a *Propionibacterium shermanii* culture, and the metabolites are added to the product in an amount ranging from about 0.3% to about 1.5% by weight.

30. A method according to claim 28 which further comprises adding to the product from about 0.01% to about 0.3% by weight an adjunct organic acid preservative ingredient selected from the group consisting of lactic acid, acetic acid, propionic acid, sorbic acid, benzoic acid, food grade salts of any of these, and mixtures thereof.

31. A method according to claim 28 wherein the product is a bakery product that has a fruit phase and a casing phase.

32. A method according to claim 28 wherein the product is a pet snack that contains meat.

\* \* \* \* \*